United States Patent [19]

Kato

[11] Patent Number: 4,625,845

[45] Date of Patent: Dec. 2, 1986

[54] OVERLOAD RELEASE LATCH

[75] Inventor: Heizaburo Kato, Ichikawa, Japan

[73] Assignee: Sankyo Manufacturing Company Ltd., Tokyo, Japan

[21] Appl. No.: 712,217

[22] Filed: Mar. 15, 1985

[30] Foreign Application Priority Data

Jul. 20, 1984 [JP] Japan .......................... 59-108930[U]

[51] Int. Cl.⁴ ............................................ F16D 43/20
[52] U.S. Cl. .................................... 192/56 R; 464/39
[58] Field of Search ............... 192/56 R, 55, 54, 89 A; 464/38, 37, 35, 36, 39

[56] References Cited

U.S. PATENT DOCUMENTS 3,168,944  2/1965  Livermont ..................... 192/56 R
3,937,036  2/1976  Sauerwein ................. 192/56 R X
4,317,511  3/1982  Asai .............................. 192/56 R Primary Examiner—George H. Krizmanich
Attorney, Agent, or Firm—Barnes & Thornburg

[57] ABSTRACT

An overload release clutch includes a bearing for receiving the load of a drive flange on a cylindrical boss. The bearing has a first row of ball bearings disposed between an upper edge of the boss and a first curved flange and a second row of ball bearings disposed between a lower edge of the boss and a second curved flange. The curved flanges are formed on the inner most portion of the drive flange, the first one facing the upper edge and the second one facing the lower edge.

6 Claims, 2 Drawing Figures

OVERLOAD RELEASE LATCH

BACKGROUND OF THE INVENTION

The present invention relates to torque limiters for use in various machines such as machine tools in order to prevent transmission of excessive torque between the input side and the output side. More particularly, the present invention relates to an improvement in torque limiter of a type wherein upper and lower projected peripheral edges vertically spaced apart are provided on a cylindrical boss connected to a drive shaft of the input side so as to be rotated integral therewith, a drive flange on the output side is disposed between said pair of projected peripheral edges, a plurality of circumferentially separated recesses are formed in the lower surface of said drive flange at the outer portion thereof and a roller bearing housed in the lower projected peripheral edge is closely fitted into the recess, said roller bearing being elastically pressed into the recess by the action of a torque spring disposed therebelow and set to a predetermined pressure, and the drive flange is rotatably mounted at the inner portion thereof on the cylindrical boss through bearing means.

A torque limiter of this kind is known and disclosed in Japanese Patent Publication No. 21894/80. In this known torque limiter, as the aforesaid bearing means there is provided three-rows bearings comprising needle bearings for receiving a load in a rotational direction of the drive flange, thrust bearings and thrust needle bearings for receiving a load of an axial direction of the drive flange thereby to rotatably mount the flange on the cylindrical boss. However, needle bearings employed in this torque limiter require a cage for holding them, such additional element complicating the bearing structure. Furthermore, the three-rows bearing system for mounting the drive flange on the boss involves a large number of parts and, therefore, assembly of the above torque limiter has been troublesome.

SUMMARY OF THE INVENTION

The present invention has been accomplished in view of the problems as discussed above, and it is therefore a general object of the present invention to provide a torque limiter which can simplify bearing means for receiving a load of said drive flange by a cylindrical boss to reduce the number of parts and make assembling easy.

According to the present invention, a torque limiter is provided which comprises a cylindrical boss connected to a drive shaft of the input side so as to be rotated integrally therewith, the boss including upper and lower edges each projecting radially outwardly therefrom. Disposed between the upper and lower edges is a drive flange of the output side, which has a plurality of circumferentially separated recesses formed in the lower surface of the flange at the outer portion thereof. Roller bearings received in the lower edge are engageable with the recesses and forced into the recesses by the action of a torque spring, and the drive flange is rotatably mounted at the inner portion thereof on the boss through bearing means. The present invention is characterized by structure of said bearing means which comprises a first row of ball bearings disposed between the upper edge and a first curved flange and a second row of ball bearings disposed between the lower edge and a second curved flange, said first curved flange being formed on an inner periphery of the drive flange at a position facing the upper edge, and said second curved flange being formed on the inner periphery of the drive flange at a position facing the lower edge.

Preferably, the upper edge of the boss includes a curved lower surface formed in facing relation with the first curved flange of the drive flange, and the lower edge of the boss includes a curved upper surface formed in facing relation with the second curved flange of the drive flange.

Other objects, features and advantages of the present invention will be apparent from the following detailed description of preferred embodiment thereof when taken in conjunction with the accompanying drawings, in which:

DETAILED DESCRIPTION OF THE INVENTION

Preferred embodiment of the present invention will now be described with reference to the accompanying drawings.

Figure 1:
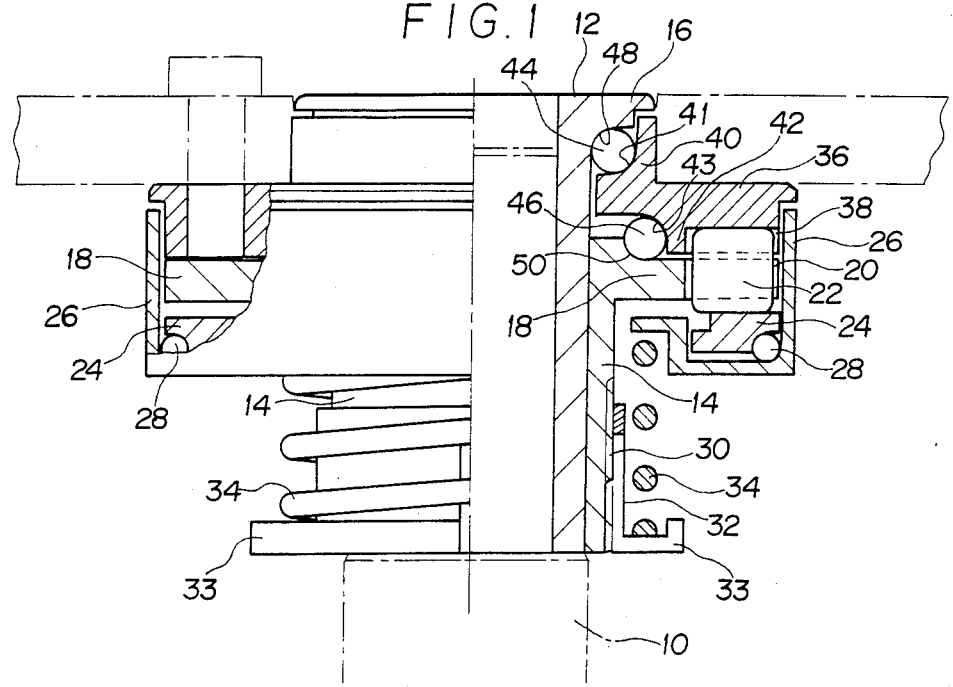
FIG. 1 is a front view partly in longitudinal section of a torque limiter in accordance with an embodiment of the present invention.
Figure 2:
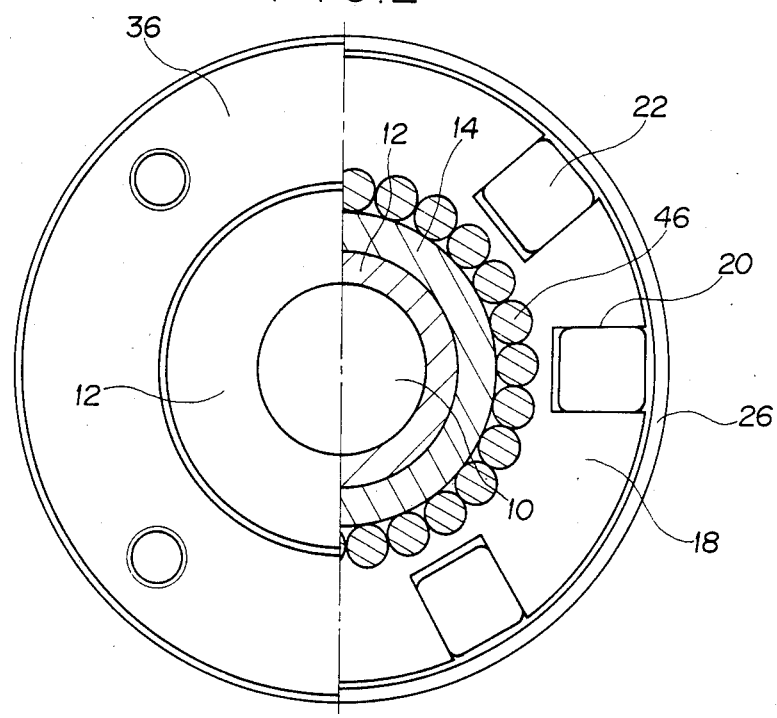
FIG. 2 is a plan view partly in cross section of the torque limiter shown in FIG. 1.

Referring to FIGS. 1 and 2, a reference numeral 10 designates a drive shaft on the input side which is, though not shown, connected to any suitable drive source. A first cylindrical boss 12 is mounted on the drive shaft 10 and a second cylindrical boss 14 is press-fit on the first boss 12, in such a manner that the first and second bosses 12 and 14 will be rotated integrally with the drive shaft 10. Formed at the upper end of the first boss 12 is a rim or edge portion 16 extending radially outwardly from the boss 12 and at the upper end of the second boss 14 is also an edge portion 18 which extends radially outwardly to a greater extent than the portion 16. As illustrated in FIG. 1, these edge portions are positioned apart from each other in the axial direction of the bosses. The edge portion 16 of the first boss 12 will be hereinafter referred to as upper edge and the portion 18 of the second boss 14 will be as lower edge.

The lower edge 18 is provided at the outer area thereof with a plurality of chambers 20 arranged at either equal or unequal intervals in the circumferential direction, each of which receives therein a roller bearing 22 in a rotatable manner. The roller bearing 22 is supported by a thrust washer 24 which is rotatably held within an overload detection cover 26 through small balls 28. A threaded portion 30 of the second boss 14 positioned below the cover 26 is threadedly engaged with a pressure nut 32 having a lower flange 33 between which and the lower surface of the cover 26 is interposed a torque spring 34 in a compressed status for urging the cover 26 upward. Compression of the torque spring 34 is adjustable by a rotation of the pressure nut 32 around the second boss 14.

Between the upper edge 16 of the first boss 12 and the lower edge 18 of the second boss 14 is disposed a drive flange 36 of the output side, which flange includes a plurality of recesses 38 formed in the lower surface of the flange at the outer portion thereof for engagement with the roller bearings 22. In the inner portion of the drive flange 36, a first curved flange 40 is formed at a position where it faces the upper edge 16 of the first boss 12, and a second curved flange 42 at a position facing the lower edge 18 of the second boss 14. The first flange 40 defines an inner surface 41 curved downwardly from outward towards inward, and the second flange 42 includes an inner surface 43 curved downwardly from inward towards outward. A first and a second row of ball bearings 44 and 46 are provided for rotatably mounting the drive flange 36 on the bosses 12 and 14. The first row of ball bearings 44 is disposed between the upper edge 16 and the first curved flange 40 while the second row of ball bearings 46 is disposed between the lower edge 18 and the second curved flange 42. The upper and lower edges 16 and 18 may be curved at 48 and 50, respectively, to provide curved surfaces in facing relation with the inner surfaces of the flanges 40 and 42.

When the drive shaft 10 is rotated by the drive source, the rotation is integrally transmitted to the first and second bosses 12 and 14. During normal operation, such rotational movement is also transmitted to the drive flange 36 by the roller bearings 22 which are received in the chambers 20 of the second boss 14 and are engaged with the recesses 38 of the drive flange 36, the engagement being maintained by the elastic force which are exerted by the torque spring 34 and transmitted to the roller bearings 22 through the cover 26, the small balls 28 and the thrust washer 24. However, when any overload acts on the output side and is applied to the drive flange 36, the roller bearings 22 get over side walls defining the recesses 38 and are disengaged from the recesses against the spring force of the torque spring 34. This releases the connection between the bosses and the drive flange 36, with a result that the drive shaft 10 runs idle with respect to the drive flange 36. By the term "overload" is meant a torque in excess of a predetermined limit, which should not act on the input side in order to avoid accidents thereof. The limit torque value is adjustable by the amount of compression of the torque spring 34.

As it could be understood from the above description, since the load of the drive flange 36 in both of the rotational direction and the axial direction are received by the two rows of ball bearings 44 and 46, number of parts required is reduced as compared with the conventional torque limiter in which three rows of ball bearings are employed as discussed hereinabove. This decrease serves to avoid complexity in structure of the device and facilitates assembly thereof. Furthermore, since no needle bearings are used it is not necessary to provide the cage for holding them, which may additionally lower the manufacturing costs.

Although the present invention has been described with reference to the preferred embodiments thereof, many modifications and alterations may be made within the spirit of the present invention.

What is claimed is:

1. A torque limiter comprising:
   a cylindrical boss connected to a drive shaft of the input side so as to be rotated integrally therewith, said boss including upper and lower edges each projecting radially outwardly therefrom;
   a drive flange of the output side disposed between said upper and lower edges, said drive flange having a plurality of circumferentially separated recesses formed in the lower surface of said drive flange at the outer portion thereof;
   roller bearings received in said lower edge of said boss, said roller bearings being engageable with said recesses and forced thereinto by the action of a torque spring; and
   a bearing means for rotatably mounting said drive flange on said boss, said bearing means comprising a first row of ball bearings disposed between said upper edge and a first curved flange and a second row of ball bearings disposed between said lower edge and a second curved flange, said first curved flange being formed on the inner portion of said drive flange at a position facing said upper edge, and said second curved flange being formed on the portion of said drive flange at a position facing said lower edge.

2. A torque limiter as claimed in claim 2, wherein said boss comprises a first cylindrical boss mounted on said drive shaft and a second cylindrical boss closely fitted on said first cylindrical boss.

3. A torque limiter as claimed in claim 2, wherein said first cylindrical boss is formed at the upper end thereof with said upper edge and said second cylindrical boss is formed at the upper end thereof with said lower edge.

4. A torque limiter as claimed in claim 1, wherein said upper edge includes a curved lower surface formed in facing relation with said first curved flange and said lower edge includes a curved upper surface formed in facing relation with said second curved flange.

5. A torque limiter as claimed in claim 1, wherein said lower edge has a plurality of chambers each for receiving said roller bearing therein.

6. A torque limiter as claimed in claim 5, wherein said roller bearings are rotatably supported by a thrust washer housed within a cover, said cover being urged upward by said torque spring.

* * * * *

UNITED STATES PATENT AND TRADEMARK OFFICE
CERTIFICATE OF CORRECTION

PATENT NO. : 4,625,845

DATED : December 2, 1986

INVENTOR(S) : Kato

It is certified that error appears in the above-identified patent and that said Letters Patent is hereby corrected as shown below:

In Col. 4, line 31, delete "2" and insert --1--.

Signed and Sealed this

Sixteenth Day of October, 1990

Attest:

HARRY F. MANBECK, JR.

*Attesting Officer*  *Commissioner of Patents and Trademarks*